(12) United States Patent
Fushiki (10) Patent No.: US 9,678,495 B2
(45) Date of Patent: Jun. 13, 2017

(54) CONTROL APPARATUS FOR PLUG-IN HYBRID VEHICLE, AND CONTROL METHOD FOR THE SAME

(71) Applicant: Shunsuke Fushiki, Susono (JP)

(72) Inventor: Shunsuke Fushiki, Susono (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 285 days.

(21) Appl. No.: 14/432,519

(22) PCT Filed: Sep. 17, 2013

(86) PCT No.: PCT/IB2013/002020
§ 371 (c)(1),
(2) Date: Mar. 31, 2015

(87) PCT Pub. No.: WO2014/053894
PCT Pub. Date: Apr. 10, 2014

(65) Prior Publication Data
US 2015/0286199 A1    Oct. 8, 2015

(30) Foreign Application Priority Data
Oct. 2, 2012    (JP) ................ 2012-220730

(51) Int. Cl.
*F02D 28/00*    (2006.01)
*G05B 19/042*    (2006.01)
(Continued)

(52) U.S. Cl.
CPC .............. *G05B 19/042* (2013.01); *B60L 3/12* (2013.01); *B60L 11/123* (2013.01); *B60L 11/14* (2013.01);
(Continued)

(58) Field of Classification Search
CPC .......... B60L 3/12; B60L 11/123; B60L 11/14; B60L 11/1816; B60L 11/1862;
(Continued)

(56) References Cited

U.S. PATENT DOCUMENTS 7,971,668 B2 *    7/2011    Ando .................... B60K 6/445
                                                                    180/65.265
2008/0262667 A1    10/2008    Otabe
(Continued)

FOREIGN PATENT DOCUMENTS

DE    102010036148 A1    3/2011
DE    102011118543 A1    5/2012
(Continued)

*Primary Examiner* — Jerrah Edwards
(74) *Attorney, Agent, or Firm* — Finnegan, Henderson, Farabow, Garrett & Dunner, LLP (57) ABSTRACT

A control apparatus for a plug-in hybrid vehicle having a secondary battery that can be charged with external power includes a stoppage period acquisition unit and a battery control unit. The stoppage period acquisition unit obtains an engine stoppage period in which an internal combustion engine is stopped. The battery control unit controls charging/discharging of the secondary battery. The battery control unit sets an upper limit value of a storage amount of the secondary battery to be lower when the engine stoppage period equals or exceeds a predetermined period than when the engine stoppage period is shorter than the predetermined period.

3 Claims, 6 Drawing Sheets

(51) Int. Cl.
*B60L 3/12* (2006.01)
*B60L 11/12* (2006.01)
*B60L 11/14* (2006.01)
*B60L 11/18* (2006.01)

(52) U.S. Cl.
CPC ....... *B60L 11/1816* (2013.01); *B60L 11/1862* (2013.01); *B60L 2210/40* (2013.01); *B60L 2220/14* (2013.01); *B60L 2240/12* (2013.01); *B60L 2240/80* (2013.01); *B60L 2260/52* (2013.01); *B60L 2260/54* (2013.01); *G05B 2219/2637* (2013.01); *G05B 2219/2639* (2013.01); *Y02T 10/6217* (2013.01); *Y02T 10/648* (2013.01); *Y02T 10/7005* (2013.01); *Y02T 10/705* (2013.01); *Y02T 10/7044* (2013.01); *Y02T 10/7072* (2013.01); *Y02T 10/7077* (2013.01); *Y02T 10/7241* (2013.01); *Y02T 90/127* (2013.01); *Y02T 90/14* (2013.01)

(58) Field of Classification Search
CPC ............ B60L 2210/40; B60L 2220/14; G05B 19/042; G05B 2219/2637; G05B 2219/2639; Y02T 10/648; Y02T 10/6217; Y02T 10/7005; Y02T 10/7044; Y02T 10/705; Y02T 10/7072; Y02T 10/7077; Y02T 10/7241; Y02T 90/127; Y02T 90/14

See application file for complete search history.

(56) References Cited

U.S. PATENT DOCUMENTS

| | | | |
|---|---|---|---|
| 2009/0159351 A1* | 6/2009 | Ando | B60K 6/445 180/65.265 |
| 2010/0140001 A1 | 6/2010 | Oe et al. | |
| 2010/0198438 A1 | 8/2010 | Iraha et al. | |
| 2011/0066308 A1 | 3/2011 | Yang et al. | |
| 2013/0211641 A1 | 8/2013 | Fujii | |

FOREIGN PATENT DOCUMENTS

| | | |
|---|---|---|
| JP | 2007-168512 | 7/2007 |
| JP | 2008-149972 | 7/2008 |
| JP | 2008-238972 | 10/2008 |
| JP | 2008-285073 | 11/2008 |
| JP | 2009-255680 | 11/2009 |
| JP | 2010-242692 | 10/2010 |
| JP | 2012-30667 | 2/2012 |
| JP | 2012-30668 | 2/2012 |
| WO | WO 2011/142446 A1 | 11/2011 |

* cited by examiner

CONTROL APPARATUS FOR PLUG-IN HYBRID VEHICLE, AND CONTROL METHOD FOR THE SAME

CROSS-REFERENCE TO RELATED APPLICATIONS

This application is a national phase application of International Application No. PCT/IB2013/002020, filed Sep. 17, 2013, and claims the priority of Japanese Application No. 2012-220730, filed Oct. 2, 2012, the content of both of which is incorporated herein by reference.

BACKGROUND OF THE INVENTION

1. Field of the Invention

The invention relates to a control apparatus and a control method for a hybrid vehicle having a secondary battery that can be charged with external power, or in other words a plug-in hybrid vehicle.

2. Description of Related Art

A hybrid vehicle that includes an internal combustion engine and a motor as vehicle-driving prime movers is available. The motor is either driven by the internal combustion engine or driven by vehicle inertia to function also as a power generator. Power generated thereby is stored in a storage apparatus installed in the vehicle, for example a secondary battery, and used to drive the motor. Further, when both a motor and a power generator are provided (as well as when the motor is caused to function as a power generator), the power generated by the power generator may be used as power for driving the motor without passing through the storage apparatus.

In recent years, a hybrid vehicle in which the storage apparatus installed in the vehicle can be charged with external power, or in other words a plug-in hybrid vehicle, has come into practical use. In a plug-in hybrid vehicle, control is performed such that at the beginning of a journey, the vehicle is basically driven by the motor alone, and when a storage amount of the storage apparatus decreases to a lower limit value, the vehicle is driven using the internal combustion engine concomitantly. Hereafter, a travel mode using only the motor at the beginning of a journey will be referred to as an electric vehicle mode, and a travel mode using the internal combustion engine and the motor concomitantly following a reduction in the storage amount will be referred to as a hybrid vehicle mode. Note, however, that when a required output exceeds an output of the motor in the electric vehicle mode, the internal combustion engine is started and a driving force thereof is also used. When the required output decreases, driving using only the motor is resumed.

In a plug-in hybrid vehicle, the electric vehicle mode is set at the beginning of a journey, and therefore opportunities to operate the internal combustion engine decrease. As a result, fuel consumption may not progress. In Japanese Patent Application Publication No. 2009-255680 (JP-2009-255680 A), when fuel remains in a fuel tank and a fuel pipe system for a long time, the fuel may deteriorate. When fuel deterioration is determined, the lower limit value of the storage amount is set to be higher, thereby increasing the number of opportunities to operate the internal combustion engine (see paragraph 0074 and FIGS. 7 and 10). By increasing the number of opportunities to operate the internal combustion engine, the fuel is consumed earlier, and therefore use of fuel in an advanced state of deterioration is suppressed.

Japanese Patent Application Publication No. 2012-030667 (JP-2012-030667 A) discloses control for increasing the number of opportunities to operate the internal combustion engine by increasing the lower limit value of the storage amount at which a switch to a driving mode using the internal combustion engine is determined when the fuel has deteriorated.

In JP-2009-255680 A and JP-2012-030667 A, the number of opportunities to operate the internal combustion engine is increased by increasing the lower limit value of the storage amount when fuel deterioration is determined, with the result that the fuel is consumed earlier. However, when a travel distance per journey is short, the storage amount does not decrease to the lower limit value, and therefore the mode is not switched. Hence, the internal combustion engine is not operated, and as a result, fuel consumption does not progress.

SUMMARY OF THE INVENTION

An object of the invention is to ensure that fuel determined to have deteriorated is consumed early in a plug-in hybrid vehicle.

A control apparatus for a plug-in hybrid vehicle according to an aspect of the invention sets an upper limit value of a storage amount of a secondary battery to be lower when a period in which an internal combustion engine is stopped equals or exceeds a predetermined period than when the engine stoppage period is shorter than the predetermined period. In so doing, a distance traveled using only a driving, force of a motor can be shortened, and as a result, opportunities to operate the internal combustion engine can be increased.

In the control apparatus described above, the upper limit value of the storage amount may be modified in accordance with a travel pattern of a subsequent journey. The control apparatus may classify journeys of the vehicle into a plurality of travel patterns corresponding to respective consumption amounts of electricity stored in the secondary battery, and predict a subsequent travel pattern on the basis of a journey history. The upper limit value of the storage amount may then be set at a value determined in accordance with the predicted travel pattern.

A control method for a plug-in hybrid vehicle according to another aspect of the invention includes: i) obtaining an engine stoppage period in which an internal combustion engine is stopped; ii) controlling charging/discharging of the secondary battery; and iii) setting an upper limit value of a storage amount of the secondary battery to be lower when the engine stoppage period equals or exceeds a predetermined period than when the engine stoppage period is shorter than the predetermined period.

According to the control apparatus and the control method described above, the number of opportunities to operate the internal combustion engine is increased, thereby promoting consumption of fuel determined to have deteriorated.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
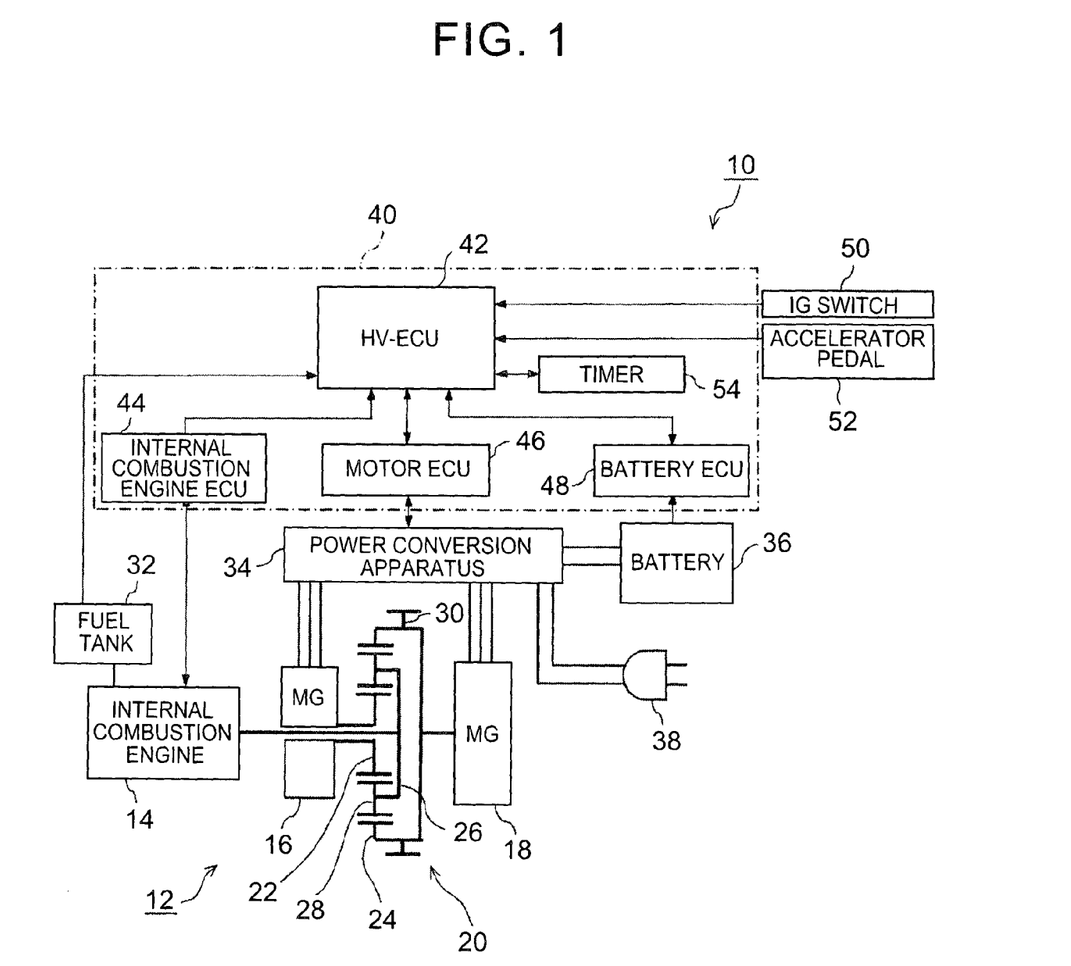
FIG. 1 is a block diagram showing configurations of main parts of a plug-in hybrid vehicle.

An embodiment of the invention will be described below with reference to the drawings. FIG. 1 is a block diagram showing configurations of main parts of a plug-in hybrid vehicle 10. A power unit 12 of the plug-in hybrid vehicle 10 includes three vehicle-driving prime movers, namely a single internal combustion engine 14 and two motors 16, 18. Both of the two motors 16, 18 can also be operated as power generators. The three prime movers 14, 16, 18 are respectively joined to a power distribution apparatus 20. The power distribution apparatus 20 includes a planetary gear mechanism, and the prime movers 14, 16, 18 are connected respectively to three elements (a carrier element, a sun element, and a ring element) of the planetary gear mechanism. In the power unit 12, one of the motors 16 is connected to a sun gear 22 serving as the sun element, and the other motor 18 is connected to a ring gear 24 serving as the ring element. Hereafter, the motor connected to the sun gear 22 will be referred to as the first motor 16, and the motor connected to the ring gear 24 will be referred to as the second motor 18. A planetary carrier 26 serving as the carrier element supports a planetary pinion 28, which is meshed to the sun gear 22 and the ring gear 24, rotatably. The internal combustion engine 14 is connected to the planetary carrier 26. The three prime movers and the three elements of the planetary gear mechanism to which the three prime movers are connected may correspond to each other in combinations other than those described above. Respective rotation speeds of the three prime movers 14, 16, 18 have a predetermined relationship determined by a gear ratio of the planetary gear mechanism. When the rotation speeds of two prime movers are determined, the rotation speed of the remaining prime mover is determined. The ring gear 24 is provided with an output gear 30 from which power is output toward a drive wheel.

The internal combustion engine 14 may be an Otto engine, a diesel engine, or an engine using another heat cycle. A fuel tank 32 is provided to store fuel that is to be supplied to the internal combustion engine 14. The fuel is a liquid fuel such as gasoline or light oil. Power is supplied to the two motors 16, 18 from a battery 36 constituted by a secondary battery via a power conversion apparatus 34. Three-phase alternating current synchronous motors may be used as the two motors 16, 18, in which case direct current power from the battery 36 is converted into three-phase alternating current power by the power conversion apparatus 34 and then supplied to the motors. Further, when the motors 16, 18 function as power generators, alternating current power generated thereby is converted into direct current power and then supplied to the battery 36. One of the motors, for example the first motor 16, may be caused to function as a power generator, and power generated thereby may be supplied to the second motor 18. Furthermore, an external connection plug 38 for connecting the plug-in hybrid vehicle 10 to an external power supply such as a commercial power supply is connected to the power conversion apparatus 34. By connecting the external connection plug 38 to the external power supply, the battery 36 can be charged externally. Charging from the external power supply will be referred to hereafter as external charging.

The plug-in hybrid vehicle 10 also includes a control apparatus 40 that controls the power unit 12. The control apparatus 40 includes a hybrid vehicle electronic control apparatus (to be referred to hereafter as an HV-ECU) 42 that is responsible for controlling the entire vehicle. The HV-ECU 42 obtains an acceleration/deceleration request from an operation of an accelerator pedal, a brake pedal, or the like by a driver, determines operating conditions of the vehicle such as a vehicle speed, respective operating conditions of the prime movers 14, 16, 18, and a storage amount of the battery 36, and determines appropriate vehicle operating conditions. The HV-ECU 42 then controls respective devices having corresponding electronic control apparatuses (ECUs) on the basis of the determined operating conditions. An internal combustion engine ECU 44 controls the internal combustion engine to a target rotation speed and a target output by controlling a throttle opening, a fuel injection amount, a valve timing, and so on of the internal combustion engine. A motor ECU 46 controls the first and second motors 16, 18 to target rotation speeds and target outputs by controlling the power conversion apparatus 34. A battery ECU 48 monitors the storage amount of the battery 36 and sets an upper limit value and a lower limit value of the storage amount. Deterioration of a battery typically advances when the storage amount is continuously low or continuously high. To prevent this deterioration, control is performed to set the upper limit value and the lower limit value such that the storage amount remains within a certain width. In a plug-in hybrid vehicle, the upper limit value may be set slightly higher than that of a normal hybrid vehicle not having an external charging function in order to extend a range of an electric travel mode.

The plug-in hybrid vehicle 10 further includes an ignition switch (IG switch) 50 with which to make the vehicle capable of journeys, an accelerator pedal 52 used by the driver to adjust an output of the power unit 12, and a timer 54 that measures time.

The three prime movers of the power unit 12 drive the vehicle in accordance with the operating conditions determined by the HV-ECU 42. The second motor 18 is joined to the output gear via the ring gear 24, and therefore the vehicle can be driven by the second motor 18 alone. When the storage amount of the battery 36 is sufficient and an efficiency of the internal combustion engine 14 is low or the like, for example during low speed travel, travel is performed using only the second motor. The vehicle can also be driven by the three prime movers cooperatively. For example, the vehicle can be driven by the respective outputs of the internal combustion engine 14 and the second motor 18 while the first motor 16 is driven to perform power generation by a part of the output of the internal combustion engine 14. The power generated thereby is supplied to the second motor 18, and when the storage amount of the battery 36 is small, the generated power is also supplied to the battery 36 in order to charge the battery 36. During vehicle braking, the second motor 18 is operated as a power generator and power generated thereby is charged to the battery 36. To charge the battery 36 from the external power supply, the external connection plug 38 is connected to the external power supply, and the battery 36 is charged via the power conversion apparatus 34.

A typical manner of use of the plug-in hybrid vehicle 10 will now be described. An external power supply is disposed in a garage, a parking space, or the like where the vehicle 10 is mainly stored. When the vehicle 10 is parked in the storage location, charging is performed by connecting the external connection plug 38 to the external power supply. When the vehicle is to be used, the external connection plug 38 is detached and the IG switch 50 is switched ON. When the IG switch 50 is switched ON, electricity is supplied to respective electric devices, whereby the vehicle becomes capable of travel. A period in which the IG switch 50 remains ON, or in other words a period extending from a point at which the IG switch 50 is switched ON to a point at which the IG switch 50 is switched OFF, will be referred to hereafter as a "journey". At the beginning of the journey, the vehicle basically travels using only a driving force of the motor, which is generated by the power stored in the battery 36. This travel mode is the electric vehicle mode. Although travel is performed basically using only the driving force of the motor in the electric vehicle mode, a driving force of the internal combustion engine 14 is used in a supplementary fashion when a required output exceeds a maximum output of the motor. When the required output falls below the maximum output of the motor, travel using only the driving force of the motor is resumed.

When the storage amount of the battery 36 falls to the lower limit value, the travel mode is switched to the hybrid vehicle mode in which the driving force of the internal combustion engine 14 is also used. At the point where the travel mode is switched to the hybrid vehicle mode, the battery storage amount is at the lower limit value, and therefore the internal combustion engine is started in order to charge the battery 36. Thereafter, similarly to a normal hybrid vehicle, travel is performed by controlling operations of the respective prime movers 14, 16, 18 in accordance with conditions. In the hybrid vehicle mode, the vehicle is basically driven using the three prime movers 14, 16, 18 cooperatively. Hence, charging/discharging of the battery 36 is suppressed in comparison with the electric vehicle mode, with the result that a load on the battery 36 is lightened. In the hybrid vehicle mode, travel may be performed using the second motor 18 alone, but travel at this time is not included in the electric vehicle mode. After switching to the hybrid vehicle mode, the hybrid vehicle mode is maintained until a subsequent external charging operation. After returning the vehicle 10 to the storage location, the IG switch 50 is switched OFF, whereupon the external connection plug 38 is connected to the external power supply in order to charge the battery 36. When charging begins or ends, a travel history in the hybrid vehicle mode is deleted so that a subsequent journey is started in the electric vehicle mode.

When a journey distance is short, the storage amount of the battery 36 may not reach the lower limit value before the IG switch 50 is switched OFF, and therefore the journey may end before the travel mode is switched to the hybrid vehicle mode. In this case, even when external charging is not performed at the end of the journey, travel is started in the electric vehicle mode in the next journey. When the storage amount reaches the lower limit value during this journey, the travel mode is switched to the hybrid vehicle mode.

When a pattern in which the distance covered during a single journey is short such that external charging is performed even though the hybrid vehicle mode has not been used occurs repeatedly, a situation in which the internal combustion engine is not operated for a long time arises. Hence, fuel may remain in the fuel tank and a fuel pipe system for a long time, and as a result, the fuel may deteriorate. By setting the lower limit value of the battery storage amount at which a switch to the hybrid vehicle mode is determined to be slightly higher, as described in JP-2009-255680 A, opportunities to operate the internal combustion engine can be increased to a certain extent. When the distance covered during a single journey is extremely short, however, the hybrid vehicle mode may still not be used. By setting the lower limit value of the storage amount even higher, the possibility of operating the internal combustion engine is increased, but when the lower limit value is set too high, the battery storage amount remains constantly high, and as a result, deterioration of the battery 36 may advance.

In the plug-in hybrid vehicle 10, fuel determined to have deteriorated is consumed early by reducing the upper limit value of the battery storage amount. Here, fuel deterioration includes not only a case in which deterioration has actually occurred, but also a case in which deterioration is assumed to have occurred and a case in which a determination of fuel deterioration is estimated to be imminent. When fuel deterioration is determined, the control apparatus 40 reduces the upper limit value set by the battery ECU 48 from a previous value thereof. As a result, the storage amount does not reach a full amount during external charging, and the charging operation is terminated when the storage amount reaches a lower value, for example 70% of the full amount. Hence, the next journey starts from a condition in which the storage amount is low, and therefore the battery storage amount reaches the lower limit value quickly such that the travel mode is switched to the hybrid vehicle mode early. Thus, the number of opportunities to operate the internal combustion engine increases. When fuel deterioration is determined, the lower limit value of the battery storage amount may be increased at the same time as the upper limit value is reduced.

Figure 2:
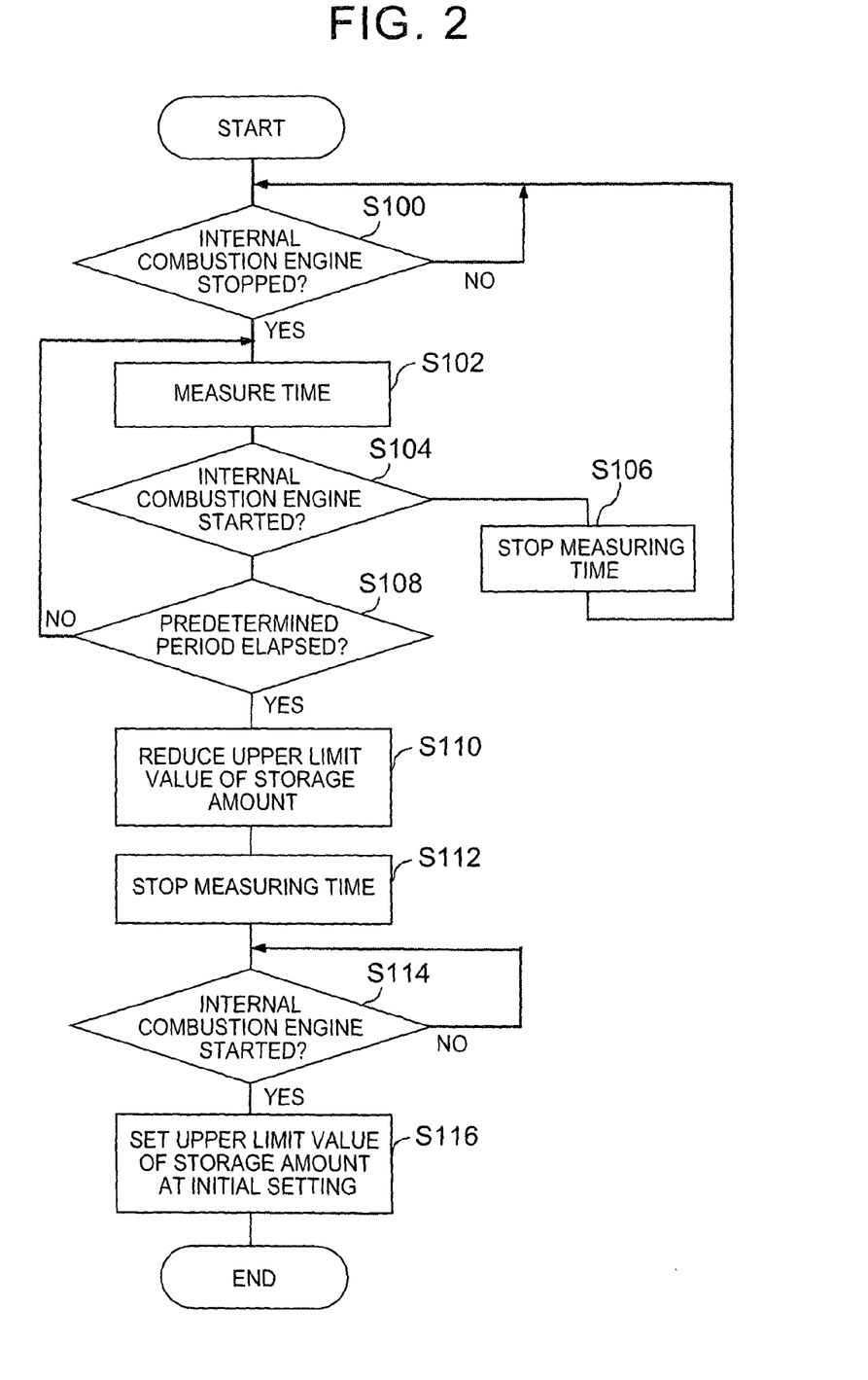
FIG. 2 is a flowchart showing an example of control of a battery storage amount.

FIG. 2 is a flowchart relating to control of the battery storage amount when the fuel has deteriorated. Fuel deterioration is determined on the basis of an elapsed time following stoppage of the internal combustion engine 14. When it is determined in step S100 that the operative internal combustion engine 14 has been stopped, the HV-ECU 42 issues an instruction to the timer 54 in step S102 to start measuring time. When it is determined in step S104 that the internal combustion engine 14 has been started, the HV-ECU 42 resets the timer 54 in step S106. After the timer 54 has been reset, the routine returns to step S100. When it is determined in step S104 that the internal combustion engine 14 has not been started, the HV-ECU 42 determines in step S108 whether or not a predetermined period has elapsed following the start of time measurement. The determination of step S104 as to whether or not the internal combustion engine 14 has been started may be made on the basis of a startup command issued to the internal combustion engine ECU 44 from the HV-ECU 42. Further, instead of or in addition to the startup command, startup of the internal combustion engine 14 may be determined by confirming that the internal combustion engine 14 has actually started. In this case, a negative determination can be made in step S104 when the internal combustion engine 14 cannot be started normally, regardless of whether or not the startup command has been issued to the internal combustion engine 14.

When it is determined in step S108 that the predetermined period has not elapsed, the routine returns to step S104 in order to monitor startup of the internal combustion engine 14. When the predetermined time has elapsed in step S108, the fuel is determined to have deteriorated, and therefore the HV-ECU 42 issues an instruction to the battery ECU 48 in step S110 to reduce the upper limit value of the battery storage amount from a value thereof prior to the elapse of the predetermined period. In addition to the upper limit value modification instruction, the HV-ECU 42 issues an instruction to the timer 54 in step S112 to stop measuring time. By reducing the upper limit value, an amount of electricity charged during the next charging operation is reduced. As a result, opportunities to operate the internal combustion engine 14 increase from the next journey onward, thereby promoting consumption of the deteriorated fuel. After the upper limit value of the battery storage amount has been reduced, monitoring is performed in step S114 to determine whether or not the internal combustion engine 14 has been started. When the internal combustion engine has been started, the upper limit value is returned to an initially set value in step S116. In step S114, startup of the internal combustion engine 14 may be monitored on the basis of a startup command issued to the internal combustion engine ECU 44 from the HV-ECU 42. Further, instead of or in addition to the startup command, startup of the internal combustion engine 14 may be determined by confirming that the internal combustion engine 14 has actually started. In this case, a negative determination can be made in step S114 when the internal combustion engine 14 cannot be started normally, regardless of whether or not the startup command has been issued to the internal combustion engine 14.

When the internal combustion engine 14 is operated, the fuel in the pipe system is consumed. Furthermore, the next journey following the reduction in the upper limit value of the battery storage amount starts in the electric vehicle mode as usual, and therefore the driver does not experience a sense of discomfort. Moreover, since the battery storage amount can be reduced, albeit temporarily, deterioration of the battery 36 can be suppressed in comparison with a case in which the storage amount remains continuously high.

In the processing shown in FIG. 2, when the internal combustion engine 14 is operated after reducing the upper limit value of the battery storage amount, the battery storage amount is return to the initially set value, and therefore consumption of the fuel in the fuel tank 32 is not promoted sufficiently. A case in which deterioration of the fuel in the fuel tank 32 is problematic can be dealt with by implementing following processing.

Figure 3:
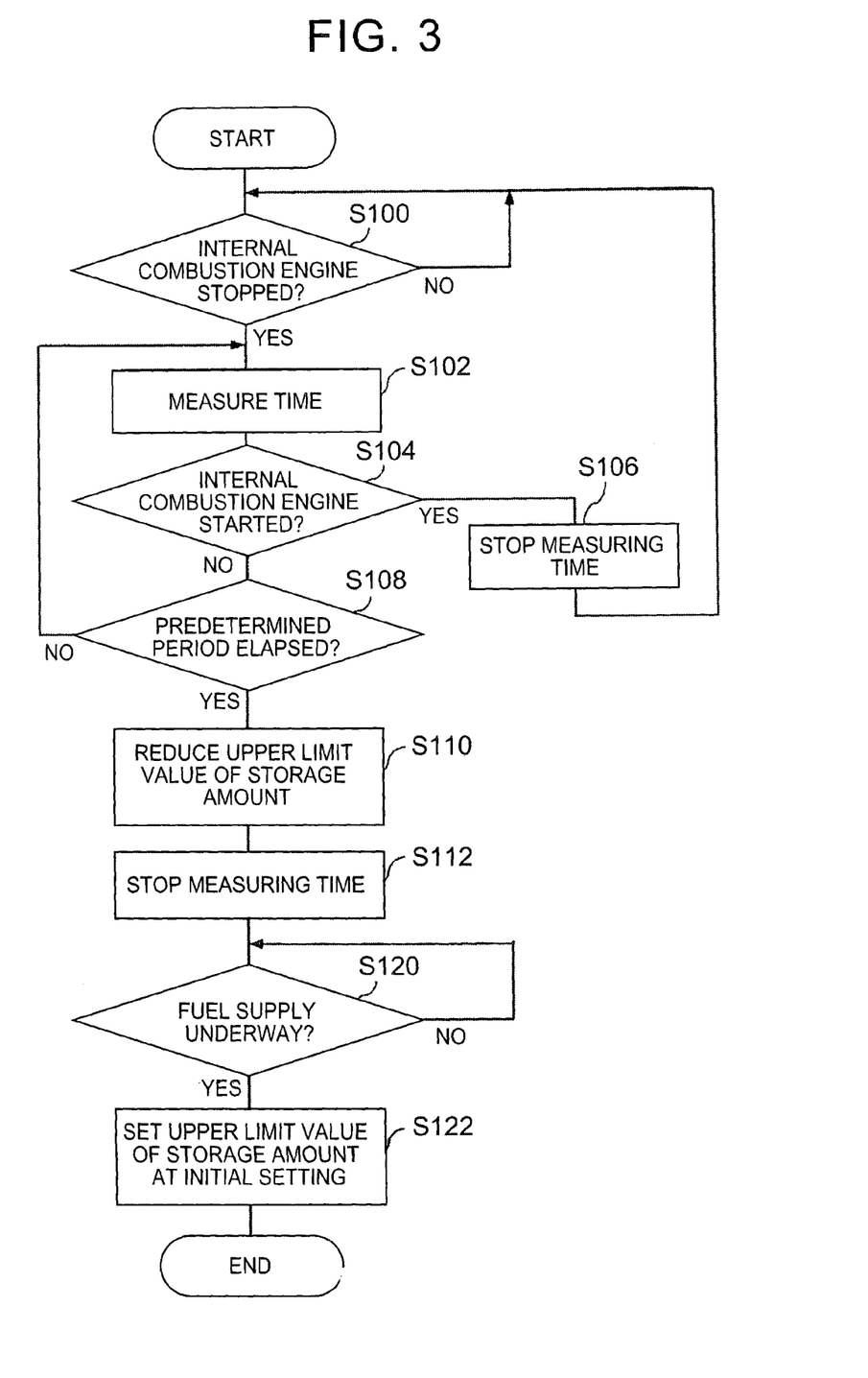
FIG. 3 is a flowchart showing another example of control of the battery storage amount.

FIG. 3 is a flowchart showing processing for promoting consumption of the fuel in the fuel tank 32. Processing up to the end of time measurement by the timer 54 following the reduction in the upper limit value of the battery storage amount is identical to that of the flowchart shown in FIG. 2, and therefore description of this part has been omitted. In the processing shown in FIG. 3, after the upper limit value is reduced in step S110 and time measurement is terminated in step S112, monitoring is performed in step S120 to determine whether or not fuel supply is underway. The determination as to whether or not fuel supply is underway can be made by determining whether or not at least a predetermined amount of fuel remains in the fuel tank 32, for example. When at least the predetermined amount of fuel has been supplied, a signal indicating this is transmitted to the HV-ECU 42. The determination as to whether or not fuel supply is underway can also be made by determining whether or not a fuel cap has been opened and closed. A signal indicating that the fuel cap has been opened and closed is transmitted to the HV-ECU 42. When fuel supply is underway, the upper limit value of the storage amount is returned to the initially set value in step S122.

When the upper limit value of the battery storage amount is reduced, the amount of electricity stored in the battery decreases, and therefore the storage amount reaches the lower limit value earlier. Accordingly, the travel mode is switched to the hybrid vehicle mode earlier, thereby increasing the number of opportunities to operate the internal combustion engine 14. In this processing, even when the internal combustion engine 14 is operated, the upper limit value of the battery storage amount is not returned to its original value until fuel is supplied. Hence, consumption of the fuel in the fuel tank 32 is promoted in addition to consumption of the remaining fuel in the fuel pipe system. Meanwhile, the next journey following the reduction in the upper limit value of the battery storage amount starts in the electric vehicle mode as usual, and therefore the driver does not experience a sense of discomfort. Moreover, the battery storage amount remains low while the upper limit value of the battery storage amount is reduced, and therefore deterioration of the battery can be suppressed.

When the upper limit value of the battery storage amount is reduced uniformly, the number of opportunities to operate the internal combustion engine may not increase in a case where the journey distance is extremely short. A control method in which the upper limit value of the battery storage amount is modified on the basis of a travel pattern will be described below. The travel pattern of the next journey is predicted from a past travel pattern of the vehicle 10, and the upper limit value of the battery storage amount is set in accordance with the predicted pattern. The travel pattern is predicted on the basis of a journey history of the vehicle 10. For example, when the travel distance of the next journey is determined to be short, the upper limit value of the battery storage amount is set to be low so that the internal combustion engine is more likely to be started even within a short travel distance.

Figure 4:
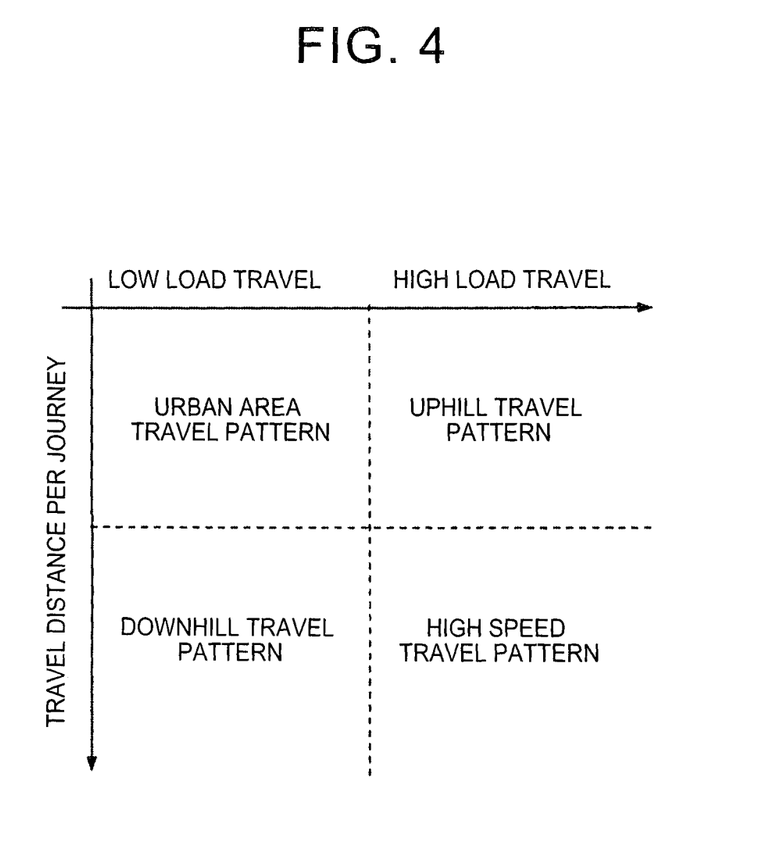
FIG. 4 is a view showing an example of travel pattern classifications.

FIG. 4 shows an example of travel pattern classification. The travel pattern is divided into four patterns defined by a load and a distance traveled over a single journey. More specifically, the travel pattern is classified as an urban area travel pattern in which the vehicle 10 travels mainly in an urban area when the load is low and the travel distance is short, a downhill travel pattern in which the vehicle 10 mainly travels on a downhill road when the load is low and the travel distance is long, an uphill travel pattern in which the vehicle 10 mainly travels on an uphill road when the load is high and the travel distance is short, and a high speed travel pattern in which the vehicle mainly travels on an expressway when the load is high and the travel distance is long. The load and the travel distance per journey may be based on loads and travel distances when the vehicle is driven by the motor in the electric vehicle mode.

The load is determined on the basis of an average value of the required output over a single journey. The average required output over a single journey is compared with a predetermined value, and when the average required output is equal to or lower than the predetermined value, low load travel can be determined. When the average required output exceeds the predetermined value, on the other hand, high load travel can be determined. The travel distance can be determined similarly by comparing the travel distance with a predetermined value.

By obtaining a frequency of each travel pattern, a travel pattern that appears frequently in relation to the vehicle can be determined. The travel pattern of the next journey can therefore be predicted on the basis of the appearance frequencies of the travel patterns, and the upper limit value of the battery storage amount can be modified accordingly. For example, when the urban area travel pattern appears frequently, a discharge current is small and the travel distance is short, and therefore the amount of consumed battery power is also small. Hence, the upper limit value of the battery storage amount is reduced by a maximum amount such that the lower limit value is reached easily. When the high speed travel pattern appears frequently, the discharge current is large and the travel distance is long, and therefore the amount of consumed battery power is also large. Hence, the likelihood of a switch to the hybrid vehicle mode increases, and therefore the upper limit value of the battery storage amount is increased by a maximum amount. In the uphill travel mode and the downhill travel mode, intermediate values are set.

By modifying the upper limit value of the battery storage amount in accordance with the travel pattern, cases in which a single journey ends in the electric vehicle mode can be reduced. Moreover, opportunities to operate the internal combustion engine can be increased, with the result that deteriorated fuel can be consumed earlier.

Figure 5:
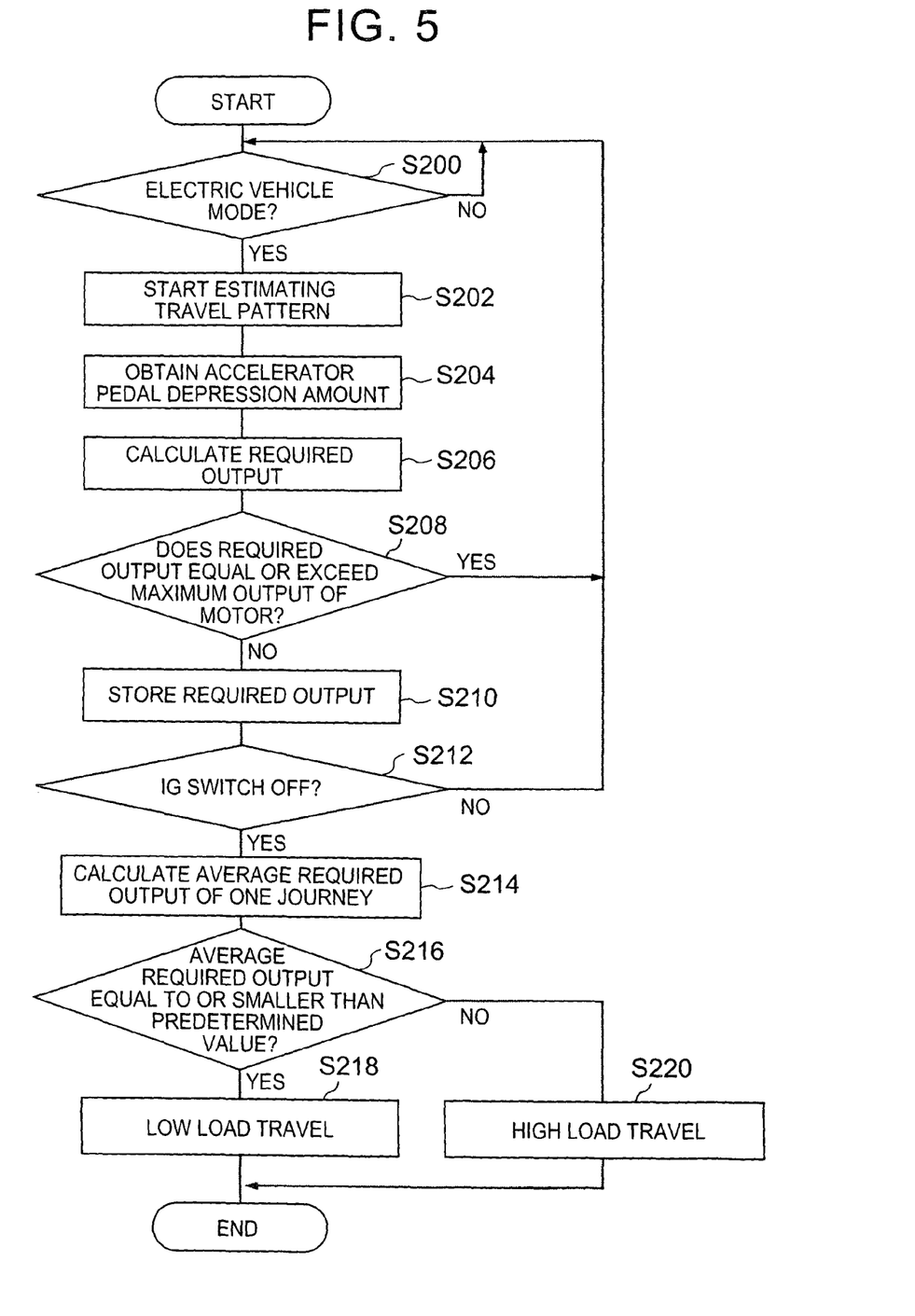
FIG. 5 is a flowchart relating to travel pattern determination processing, in particular processing for differentiating between high load travel and low load travel.

A method of classifying the travel pattern will now be described. This processing can be executed by the control apparatus 40, and more particularly the HV-ECU 42. FIG. 5 is a flowchart relating to processing for differentiating between low load travel and high load travel. When travel begins in the electric vehicle mode in step S200, processing for estimating the travel pattern in relation to the load is started in step S202. The reason for limiting this processing to travel in the electric vehicle mode is that the travel pattern is used to manage the battery storage amount. In other words, in this processing, the travel pattern is obtained during travel in the electric vehicle mode, which has a large effect on the reduction in the battery storage amount. In step S204, a depression amount of the accelerator pedal is obtained, and in step S206, the output required by the driver is calculated from the pedal depression amount. When the calculated required output equals or exceeds the maximum output of the motor, the routine returns to step S200. When a negative determination is made in step S208, the required output calculated in step S206 is stored in step S210.

At the end of the journey, an average required output of the journey during travel in the electric vehicle mode, i.e. using only the motor, is calculated. More specifically, the required output is calculated and stored until the IG switch 50 is switched OFF, and when the IG switch 50 is switched OFF in step S212, the average required output of the current journey is calculated in step S214. In a case where calculation is no longer possible after the IG switch 50 is switched OFF, calculation of the average required output and subsequent processing are performed during the next journey. In step S216, the calculated average required output is compared with a predetermined value, and when the average required output is equal to or smaller than the predetermined value, the current journey is determined to correspond to low load travel in step S218. When the average required output exceeds the predetermined value, on the other hand, the current journey is determined to correspond to high load travel in step S220.

Figure 6:
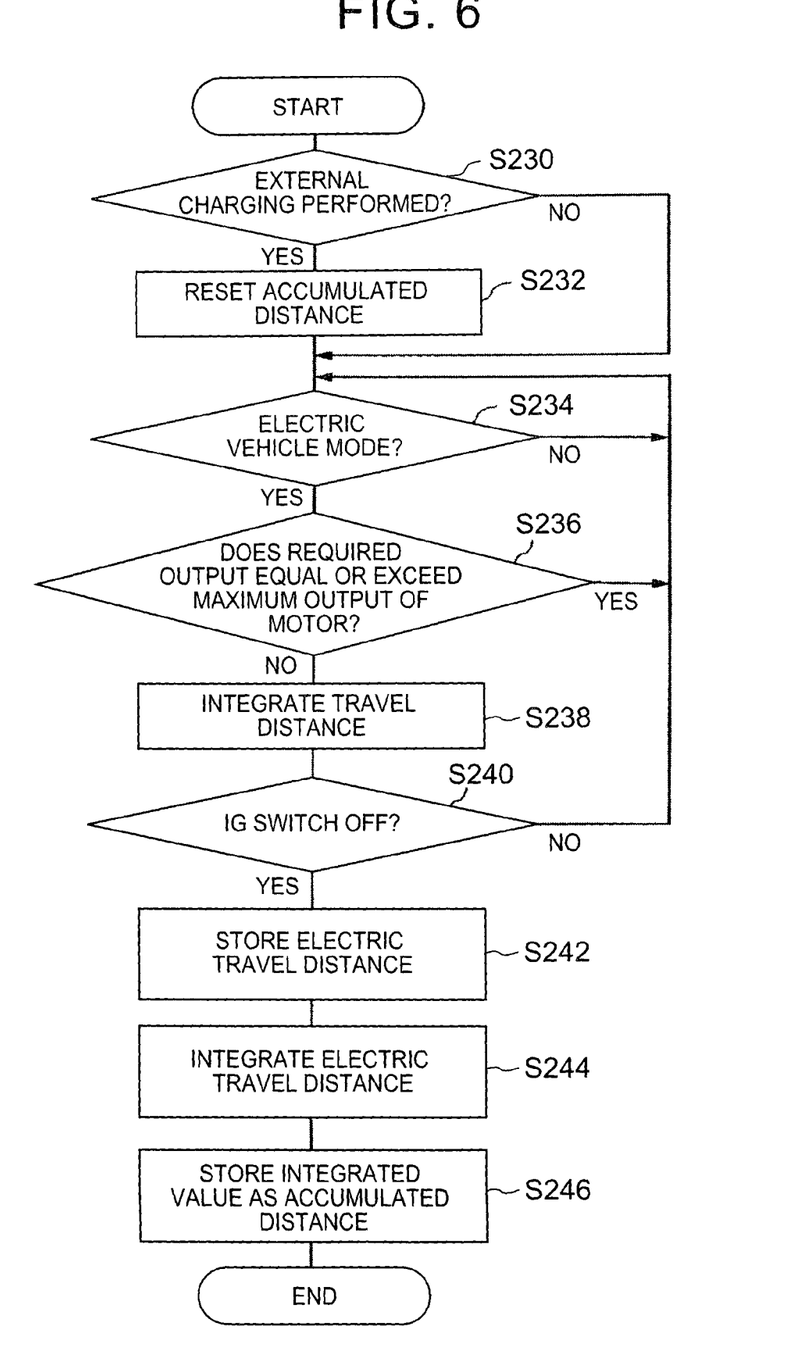
FIG. 6 is a flowchart relating to the travel pattern determination processing, in particular determination processing based on a travel distance.

FIG. 6 is a flowchart relating to processing for obtaining a distance traveled in the electric vehicle mode. Similarly to the load, the travel distance is obtained while the vehicle 10 is driven by the motor in the electric vehicle mode that has a larger effect on the battery storage amount. First, in step S230, a determination is made as to whether or not external charging has been performed. When external charging has been performed, an accumulated distance is reset in step S232. The accumulated distance is a sum of distances traveled in the electric vehicle mode over a plurality of journeys between which external charging is not performed. In other words, the accumulated distance is the distance traveled in the electric vehicle mode following a previous external charging operation. In step S234, travel begins in the electric vehicle mode, and in step S236, a determination is made as to whether or not the required output equals or exceeds the maximum output of the motor. When step S236 is affirmative, the routine returns to step S234, and when step S236 is negative, the travel distance is integrated in step S238. As a result, the distance traveled in the electric vehicle mode using only the motor (i.e. an electric travel distance of a single journey) is calculated. The travel distance may be determined from an output of a speed sensor that detects rotation of a vehicle wheel or the like, for example.

At the end of the journey, calculation processing relating to the travel distance is performed, whereupon the routine is terminated. More specifically, the journey is determined to be over when the IG switch 50 is switched OFF. In a case where calculation is no longer possible after the IG switch 50 is switched OFF, the calculation processing is performed during the next journey. In the calculation processing relating to the travel distance, first, in step S242, the electric travel distance of the current journey is stored. Next, in step S244, the electric travel distance is integrated. In other words, the accumulated distance is updated by adding the electric travel distance of the current journey to the accumulated distance up to the previous journey. In step S246, the accumulated distance is stored.

The travel pattern is classified as shown in FIG. 4 in accordance with the high load pattern and low load pattern determined by the processing shown in FIG. 5 and the electric travel distance per journey determined by the processing shown in FIG. 6. As a result, the operating conditions of the vehicle during travel in the electric vehicle mode can be determined.

Next, a method of estimating an engine stoppage period using the travel pattern classifications shown in FIG. 4 will be described. In the processing shown in FIG. 2 or FIG. 3, the engine stoppage period is calculated using the timer 54, which continues to measure time regardless of the ON/OFF condition of the IG switch 50. In a vehicle not equipped with a timer, however, the stoppage period of the internal combustion engine must be obtained using another method.

During a journey in the uphill travel pattern, the downhill travel pattern, or the high speed travel pattern, the amount of electricity consumed from the battery increases, and therefore the battery storage amount reaches the lower limit value within a single journey. It may therefore be assumed that the electric vehicle mode is switched to the hybrid vehicle mode such that when the vehicle is returned to the storage location, charging is performed from the external power supply. Hence, it may be estimated that in the above three travel patterns, travel in the electric vehicle mode occurs once over the course of a single day. In the urban area travel pattern, the travel mode may not be switched to the hybrid vehicle mode during a single journey. In other words, travel in the electric vehicle mode may be performed continuously over a plurality of journeys following a single external charging operation. In this case, it is estimated that the accumulated distance determined by the processing of FIG. 6 reaches the predetermined value within a single day. When a number of days since a previous operation of the internal combustion engine reaches a predetermined number of days, fuel deterioration is determined, and therefore the processing to reduce the upper limit value of the battery storage amount is performed. The processing for obtaining the stoppage period of the internal combustion engine may be executed by the HV-ECU 42.

This time measurement processing is executed in step S102 of the processing shown in FIG. 2 or FIG. 3. As a result, the stoppage period of the internal combustion engine 14 can be estimated even in a vehicle not including the timer 54. Note that this method of estimating the stoppage period of the internal combustion engine cannot be applied to low-frequency use in which the vehicle is almost never used on weekdays and is used only on weekends. When the method is applied to a vehicle that is used almost every day, such as a sales vehicle or a vehicle used to commute to work or the like, however, the stoppage period of the internal combustion engine can be estimated effectively.

The invention claimed is:

1. A control apparatus for controlling a plug-in hybrid vehicle including a secondary battery that can be charged with external power, the control apparatus performing control so as to drive the vehicle using only a motor at the beginning of a journey and to start an internal combustion engine when a storage amount of the secondary battery falls to or below a predetermined value to drive the vehicle using the motor and the internal combustion engine concomitantly, the control apparatus comprising:

at least one ECU configured to:

obtain an engine stoppage period in which an internal combustion engine is stopped, control charging and discharging of the secondary battery, and set an upper limit value of a storage amount of the secondary battery to be lower when the engine stoppage period equals or exceeds a predetermined period than when the engine stoppage period is shorter than the predetermined period, wherein the control apparatus is configured to classify journeys of the vehicle into a plurality of travel patterns corresponding to respective consumption amounts of electricity stored in the second battery, on the basis of an average value of required output during travel using only the motor at the beginning of a single journey, and a travel distance, and the control apparatus predicts a travel pattern of a subsequent journey on the basis of an appearance frequency of the classified travel pattern, and the ECU is configured to set the upper limit value of the storage amount used when the engine stoppage period equals or exceeds the predetermined period at a value determined in accordance with the predicted travel pattern.

2. A control method for a plug-in hybrid vehicle including the control apparatus of claim 1 and a secondary battery that can be charged with external power, the control method comprising:

obtaining, by the ECU, an engine stoppage period in which an internal combustion engine is stopped;

controlling, by the ECU, charging and discharging of the secondary battery; and setting, by the ECU, an upper limit value of a storage amount of the secondary battery to be lower when the engine stoppage period equals or exceeds a predetermined period than when the engine stoppage period is shorter than the predetermined period.

3. The control method according to claim 2, further comprising:

driving, by the ECU, the plug-in hybrid vehicle using only a motor at the beginning of a journey;

starting, by the ECU, the internal combustion engine when the storage amount of the secondary battery falls to or below a predetermined value such that the plug-in hybrid vehicle is driven using the motor and the internal combustion engine concomitantly;

classifying, by the ECU, journeys of the plug-in hybrid vehicle into a plurality of travel patterns corresponding to respective consumption amounts of electricity stored in the secondary battery;

predicting, by the ECU, a travel pattern of a subsequent journey on the basis of a journey history; and setting, by the ECU, the upper limit value of the storage amount used when the engine stoppage period equals or exceeds the predetermined period at a value determined in accordance with the predicted travel pattern.

* * * * *